United States Patent
Nakamaru et al.

[19]

[11] Patent Number: 5,805,545
[45] Date of Patent: Sep. 8, 1998

[54] MIDI STANDARDS RECORDED INFORMATION REPRODUCING DEVICE WITH REPETITIVE REPRODUCTION CAPACITY

[75] Inventors: Noboru Nakamaru; Shinji Suzuki; Toshiyuki Katsu; Akira Kikuchi; Tatsushi Iizuka; Masaharu Sakamoto, all of Tokyo, Japan

[73] Assignee: Pioneer Electronic Corporation, Tokyo, Japan

[21] Appl. No.: 922,501

[22] Filed: Jul. 31, 1992

[30] Foreign Application Priority Data

Aug. 14, 1991 [JP] Japan .................................. 3-204329
Aug. 14, 1991 [JP] Japan .................................. 3-204330

[51] Int. Cl.⁶ ...................................................... G11B 7/00
[52] U.S. Cl. ............................................ 369/48; 369/124
[58] Field of Search .................................. 369/32, 47–50, 369/53–54, 58, 124; 84/600, 618, 645; 358/342; 386/95, 96, 105–106, 125–126

[56] References Cited

U.S. PATENT DOCUMENTS

| | | | |
|---|---|---|---|
| 4,688,105 | 8/1987 | Bloch et al. | 358/335 |
| 4,698,695 | 10/1987 | Kosaka et al. | 369/58 X |
| 4,962,494 | 10/1990 | Kimura | 369/58 X |
| 4,992,886 | 2/1991 | Klappert | 358/342 |
| 4,995,026 | 2/1991 | Makabe et al. | |
| 5,056,075 | 10/1991 | Maruta et al. | 369/58 X |
| 5,097,459 | 3/1992 | Yoshio | 369/48 |
| 5,130,966 | 7/1992 | Yoshio et al. | 369/49 |
| 5,159,143 | 10/1992 | Emi et al. | 369/47 X |
| 5,177,728 | 1/1993 | Otsubo et al. | 369/58 X |

FOREIGN PATENT DOCUMENTS

0380746  8/1990  European Pat. Off. .
0384073  8/1990  European Pat. Off. .

*Primary Examiner*—W. R. Young
*Attorney, Agent, or Firm*—Sughrue, Mion, Zinn, Macpeak & Seas, PLLC

[57] ABSTRACT

The invention is recorded information reproducing device suitable for use in a kara-oke device and the like which reproduces sound information recorded on an information recording medium such as a CD (Compact Disk), LVD (laser Video Disk) or the like according to the MIDI (Musical Instrument Digital Interface) standards, and which also allows repeated practice in synchronization with the progress of music in kara-oke and the like. The recorded information reproducing device which reproduces sound from an information recording medium M on which encoded musical information AI and control information CI are recorded according to the MIDI standards. The recorded information reproducing device 100 includes a musical information reproduction unit for decoding the musical information to output reproduced musical information $S_A$; a control information reproduction unit for decoding the control information to output a clock signal $S_C$ for timing control; and a control means, in accordance with the clock signal $S_C$, for controlling the sequence of reproduction of the music information in the music information reproduction unit 101 or a data storage means 103B, in accordance with the clock signal $S_C$, for temporarily storing the reproduced musical information $S_A$ before it is output.

4 Claims, 10 Drawing Sheets

| BYTE | DATA |
|---|---|
| 1 | STATUS BYTE — $NF_{61}$ ⎫ $NF_{16}$ |
| 2~5 | TRACK LENGTH — $NF_{62}$ ⎭ |
| 6~n | CONTROL COMMAND DATA — $NF_{71}$ ⎫ $NF_{17}$ |
| n+1~n+2 | TRACK END DATA — $NF_{72}$ ⎭ |

LF
- $LF_1$ HEADER OF FILE
- $LF_2$ HEADER OF TRACK
- $LF_3$ LYRICS DATA 1
- $LF_4$ TIMING MAP 1
- $LF_5$ TRACK END DATA
- $LF_6$ HEADER OF TRACK
- $LF_7$ LYRICS DATA 2
- $LF_8$ TIMING MAP 2
- $LF_9$ TRACK END DATA
- $LF_{10}$ HEADER OF TRACK
- $LF_{11}$ LYRICS DATA n
- $LF_{12}$ TIMING MAP n
- $LF_{13}$ TRACK END DATA

FIG. 12 (A)
| BYTE | DATA | |
|---|---|---|
| 1 | STATUS BYTE | LF21 |
| 2~5 | TRACK LENGTH | LF22 |
| 6 | STATUS BYTE | LF23 |
| 7~9 | LYRICS DISPLAY COLOR | LF24 |
| 10 | STATUS BYTE | LF25 |
| 11~13 | LYRICS SCROLL COLOR | LF26 |
| 14~n | LYRICS DATA | LF3 |
| n~m | TIMING MAP | LF4 |
| m+1~m+2 | TRACK END DATA | LF5 |
{LF21–LF26} = LF2
FIG. 12 (B)
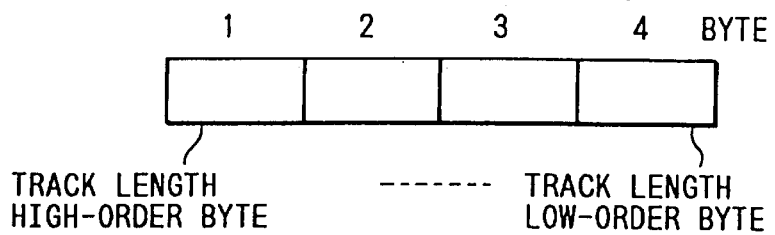
TRACK LENGTH HIGH-ORDER BYTE ------ TRACK LENGTH LOW-ORDER BYTE
FIG. 12 (C)
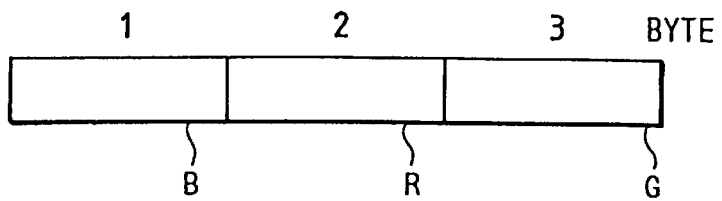
B   R   G FIG. 13
| B | R | G | COLOR |
|---|---|---|---|
| 0 | 0 | 0 | BLACK |
| 0 | A | A | OCHER |
| 0 | A | F | YELLOW GREEN |
| A | 0 | F | FRESH GRASS COLOR |
| A | A | A | GREY |
| A | A | F | BROWNISH GREEN |
| A | F | A | PINK |
| F | 0 | F | SKY BLUE |
| F | A | 0 | BLUISH PURPLE |
| F | F | 0 | PURPLE |
| F | F | F | WHITE |
FIG. 14
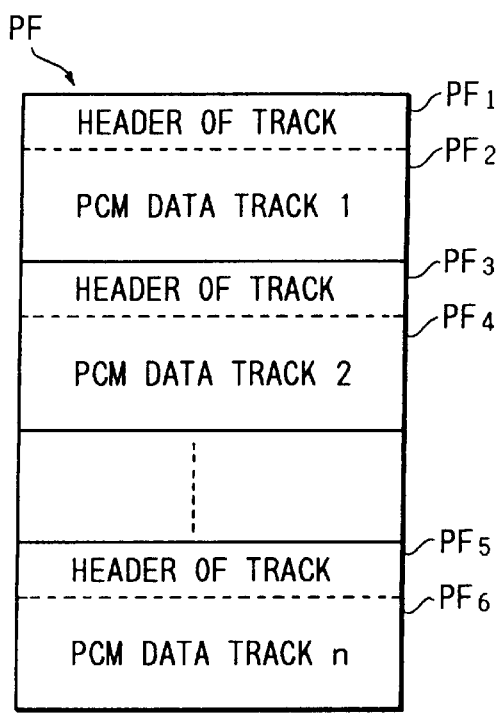
FIG. 15
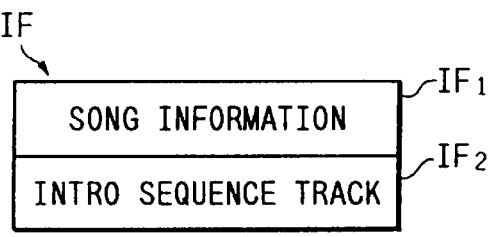

MIDI STANDARDS RECORDED INFORMATION REPRODUCING DEVICE WITH REPETITIVE REPRODUCTION CAPACITY

BACKGROUND OF THE INVENTION

1. Field of the Invention

The present invention relates to a recorded information reproducing device and, in particular, to a recorded information reproducing device preferable to use in a reproducing device such as a kara-oke device (a device for playing an accompaniment recorded on a recording medium) which reproduces sound information recorded on an information recording medium such as a CD (Compact Disk), an LVD (Laser Video Disk) or the like according to the MIDI (Musical Instrument Digital Interface) standards.

2. Description of the Background

Conventionally, as a so called kara-oke device, there are known some devices which respectively use the CD, LVD or the like.

Here, FIG. 16 is a block diagram of the structure of a conventional device which is referred to as an LVD kara-oke playing device. As shown in FIG. 16, the illustrated LVD kara-oke playing device $K_1$ includes an LVD automatic changer $PL_1$ which houses and reproduces a plurality of laser video disks $D_1$ each serving as a kara-oke information recording medium, a commander $CM_1$ which controls the LVD automatic changer $PL_1$ to select the laser video disks $D_1$ in the LVD automatic changer $PL_1$ in accordance with a request input from an operation part $CB_1$, an amplifier $AM_1$ and speakers $SP_1$, $SP_2$ which are used to output a reproduced audio signal as sounds, an image display device $GD_1$ which displays a reproduced image signal as an image, and a microphone $MC_1$ which is used to convert a sound sung into an audio signal and output the audio signal to the amplifier $AM_1$. The amplifier $AM_1$ mixes the audio signal from the LVD automatic changer $PL_1$, which is a so called kara-oke music sound, with the audio signal of the sung sound from the microphone $MC_1$ and then outputs the mixed audio signal to the speakers $SP_1$, $SP_1$. In some cases, the commander $CM_1$ can normally include the operation part $CB_1$.

Also, in FIG. 17, there is shown a block diagram of the structure of a conventional device which is referred to as a CD kara-oke playing device $K_2$. As shown in FIG. 17, the CD kara-oke playing device $K_2$ includes a CD automatic changer $PL_2$ for housing and reproducing a plurality of compact disks $D_2$ which are a kara-oke information recording medium, a commander $CM_2$ for controlling the CD automatic changer $PL_2$ to select the compact disks $D_2$ in the CD automatic changer $PL_2$ in accordance with a request input from an operation part $CB_2$, an amplifier $AM_2$ and speakers $SP_3$, $SP_4$ respectively used to output a reproduced audio signal as a sound, a graphic decoder DE for converting graphic data reproduced from subcode data in the compact disk $D_2$ into an image signal, an image display device $GD_2$ for displaying the image signal as an image, and a microphone $MC_2$ for converting a sung sound into an audio signal and outputting the audio signal to the amplifier $AM_2$. The amplifier $AM_2$ mixes the audio signal from the CD automatic changer $PL_2$, which is a so called a kara-oke music, with the audio signal of the sung sound from the microphone $MC_2$ and output the mixed audio signal to the speakers $SP_3$, $SP_4$. In some cases, the commander $CM_2$ may normally include the operation part $CB_2$ and graphic decoder DE.

According to the above-mentioned structures of the conventional kara-oke devices, one is able to sing a song to the accompaniment of the kara-oke music and is also able to appreciate the image from a display at the same time.

However, when a person tries to practice the lyrics of a song repeatedly to the above-mentioned conventional kara-oke playing device, in the case of the LVD kara-oke device, the person can repeat only every chapter of the lyrics and thus the current chapter does not always coincide with the beginning of the lyrics the person wants to sing. Also, in the case of the CD kara-oke device, repetition to an arbitrary desired position of the lyric lines of a song is possible but, for example, such repeated practice is not possible as firstly the person listens to the kara-oke playing and singing of the lyric lines of music the person wants to practice simultaneously for four bars to the tempo of the music and next the person practices the singing of the lyric lines of the same four bars of the music while only the kara-oke playing is being accompanied.

SUMMARY OF THE INVENTION

In view of the above-mentioned circumstances of the conventional kara-oke devices, it is an object of the invention to provide a recorded information reproducing device which can realize a repetitive practice synchronized with the progress of music in a kara-oke device and the like.

In order to solve the above-mentioned problems, according to the first aspect of the invention, as shown in FIG. 1A which is an explanatory view of the principles of the invention, there is provided a recorded information reproducing device 100 for reproducing music from an information recording medium M on which encoded music information AI and control information CI are recorded according to the MIDI standards, the device 100 comprising: music information reproduction means 101 for decoding the encoded music information to output a reproduced music signal $S_A$; control information reproduction means 102 for decoding the encoded control information CI to output a clock signal $S_C$ for timing control; and, control means 103A, in accordance with the clock signal $S_C$, for controlling the sequence of reproduction of the music information in the music information reproduction means 101.

In order to solve the above-mentioned problems, according to the second aspect of the invention, as shown in FIG. 1B which is an explanatory view of the principles of the invention, there is provided a recorded information reproducing device 100 for reproducing a sound from an information recording medium M in which encoded music information AI and control information CI are recorded according to the MIDI standards, the recorded information reproducing device 100 including musical information reproduction means 101 for decoding the encoded music information and outputting reproduced music information $S_A$, control information reproduction means 102 for decoding the encoded control information CI and outputting a clock signal $S_C$ for control of a timing, and data storage means 103B, in accordance with the clock signal $S_C$, for storing the reproduced music information $S_A$ temporarily and then outputting the same.

According to the first aspect of the invention having the above structure, by using the timing controlling clock signal out of the subcode information according to the MIDI standards, repeated play or the like is possible at the accurate position of the lyrics irrespective of the tempo of music, which facilitates the singing practice to the kara-oke device.

According to the second aspect of the invention having the above-mentioned structure, by using the timing control clock signal among the subcode information according to the MIDI standards to thereby allow the data storage means 103B to store data provisionally, repetitive playing and the like can be realized at the accurate position of the lyric lines of music irrespective of the tempo of the music, which can facilitate the practice by use of a kara-oke device.

BRIEF DESCRIPTION OF THE DRAWINGS

FIG. 12A–12C are views of the details of the structure of the lyrics file shown in FIG. 11;

FIG. 13 is a view of an example of a color code shown in FIG. 12;

FIG. 14 is a view of the structure of a PCM file shown in FIG. 8;

FIG. 15 is a view of the structure of a chart file shown in FIG. 8;

DETAILED DESCRIPTION OF THE PREFERRED EMBODIMENTS

Figure 1A:
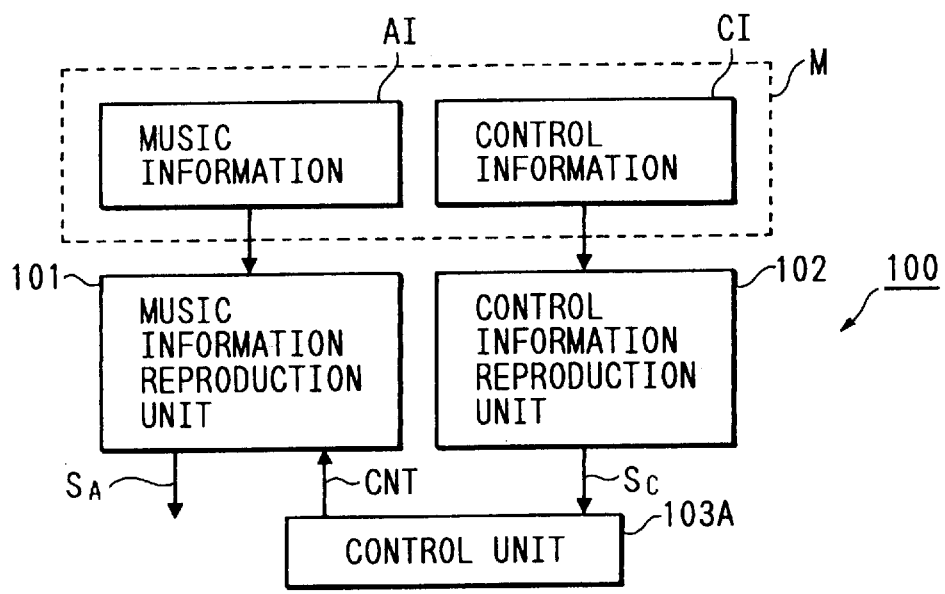
FIGS. 1A and 1B are explanatory views of the principles of the invention.
Figure 1B:
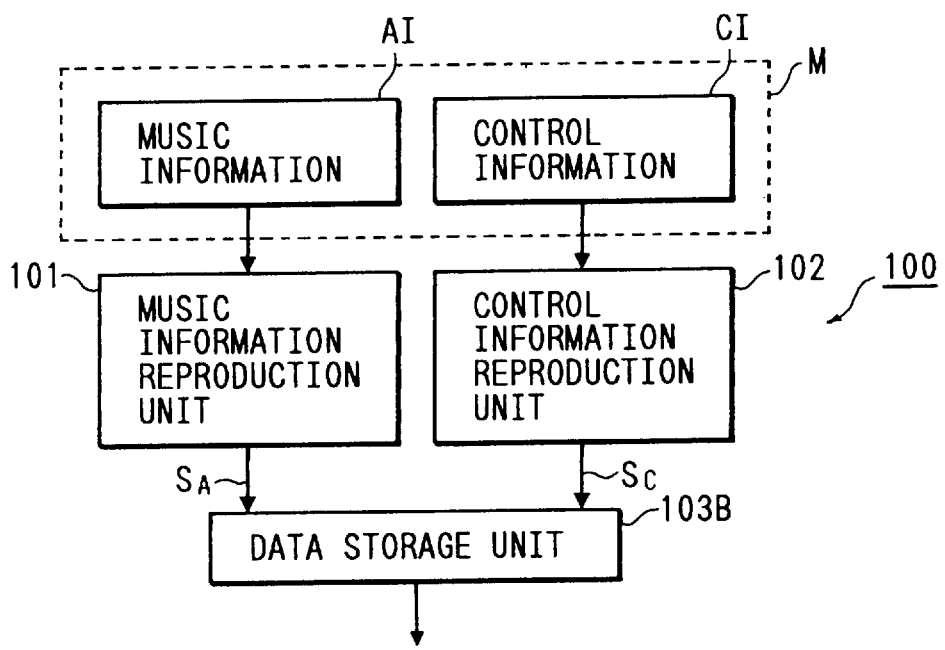

Prior to description of embodiments of a recorded information reproducing device according to the invention, description will be give of the MIDI standards, MIDI sound source and MIDI kara-oke format used in the present invention with reference to FIGS. 5 through 15.

MIDI (Musical Instrument Digital Interface) standards are standards which are established so that musical instruments such as a synthesizer, an electronic piano and the like are interconnected with one another to thereby be able to exchange information therebetween.

An electronic musical instrument is referred to as a MIDI instrument, which includes hardware according to the MIDI standards and has a function to transmit and receive a MIDI control signal, that is, an instrument playing control signal of a type defined to carry music information.

In disks such as a CD (compact disk), a CD-V (video), and LVD (laser video disk) including a CD format digital sound and the like as well as in tapes such as a DAT and the like, there is recorded a subcode which consists of P, Q, R, S, T, U, V and W channels. Among the channels, P and Q channels are used to control a disk player or for the purpose of display.

On the other hand, R~W channels are respectively an empty channel which is referred to as a user's bit. The application of the user's bit has been studied in various fields such as a graphic, a sound, an image and the like and standards for a graphic format have already been proposed.

The user's bit is also capable of recording a MIDI format signal therein and the standards for the user's bit have already been proposed as well.

In this case, an audio video signal reproduced by a disk player can be supplied to an AV system so that a program recorded on the disk can be seen and listened to and, at the same time, the disk player can be combined with the AV system or playing program information can be supplied to other MIDI instruments. Therefore, the user's bit has been studied for its application in various fields such as construction of an AV system with a concert-hall presence including an electronic musical instrument, preparation of educational software and the like.

The MIDI instrument plays music along an instrument playing program to be formed by MIDI signals which can be obtained by converting MIDI format signals supplied sequentially from a disk player into serial signals.

At first, the MIDI control signals that are supplied to the MIDI instrument are respectively serial data having a transfer rate of 31.25[K baud], in which 1 byte of data is composed of a total of 10 bits including 8 bits of data, 1 bit of start bit and 1 bit of stop bit.

Also, a message which provides music information can be made up by combining at least one status byte for specifying the kind of data to be transmitted and a MIDI channel with one or two data bytes to be guided by the status. Therefore, one message is composed of 1~3 bytes and it takes a transfer time of 320~960 [μsec] to transfer the message. An instrument playing program is formed of a series of messages.

Figure 5:
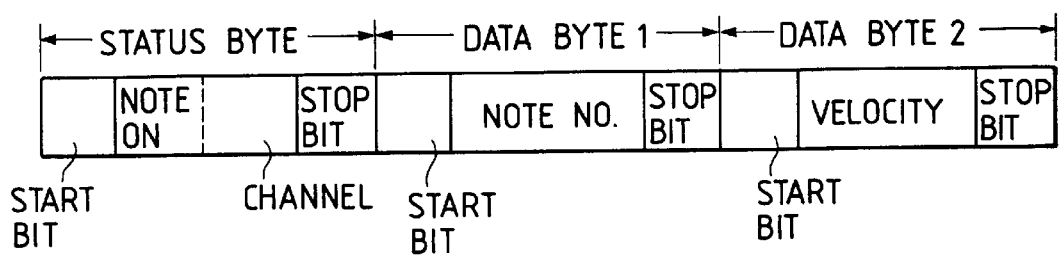
FIG. 5 is a view of the structure of a note-on-message employed in the MIDI.

As an example of such message, there is shown in FIG. 5 a structure of a note-on-message which is one of channel voice messages.

Figure 6:
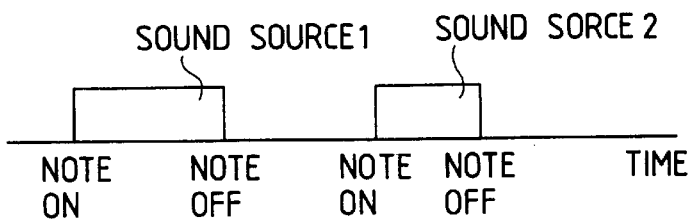
FIG. 6 is a view of a note-on-message and a note-off-message.

The note-on-message of the status byte is, for example, an instruction corresponding to an operation to depress a key on a keyboard and is used in combination with a note-off-message corresponding to an operation to release the key of the keyboard. This is shown in FIG. 6. The note number of the data byte 1 specifies one of 128 stages allocated to the keys of a keyboard of an 88-key piano with the [middle C] of the piano as a center. The velocity of the data byte 2 is in general used to differentiate the stresses of sounds. When the MIDI instrument is given a note-on-message, then the MIDI instrument generates a sound of a specified scale at a specified stress. Also, when it receives a note-off-message, then the MIDI instrument performs, for example, an operation to release the key of the piano keyboard.

Also, as a further message, there is a system real time message. The system real time message is used to allow the MIDI instrument to be operated in a synchronized manner. The system real time message contains therein a timing clock. A MIDI connected system is able to operate in a synchronized manner due to this message (F8h, (h:hexadecimal digit)) which is supplied thereto at a rate of 24 per a quarter note. The data transmitting side may continue to transmit the timing clocks (F8h) according to its own tempo information even when no playing is performed. The data receiving side, which is set in a MIDI sink mode (which is a mode to be synchronized with a timing clock of MIDI IN), can be synchronized with an external clock in a state in which it waits for start (FAh) or continue (FBh).

Figure 7:
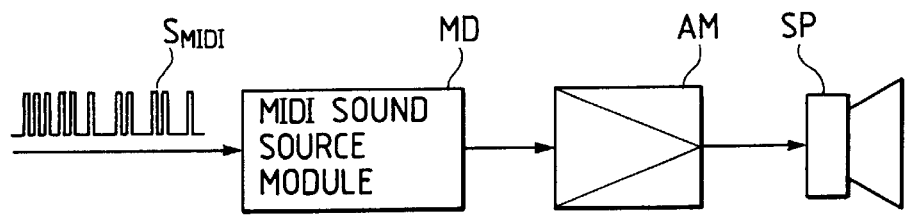
FIG. 7 is a view of the structure of a musical sound generation device according to the MIDI.

From the foregoing description, therefore, instead of an electronic musical instrument, as shown in FIG. 7, a MIDI sound source module MD, an amplifier AM and a speaker SP can be used to produce an arbitrary musical sound by means of a MIDI control signal $S_{MIDI}$.

Description will be given below of a MIDI kara-oke file format for use in the present invention with reference to FIGS. 8 to 15.

Figure 8:
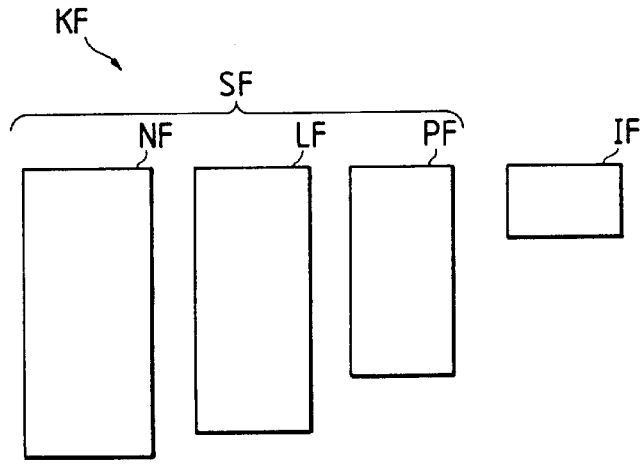
FIG. 8 is a view of the structure of an MIDI kara-oke format used in the invention.
Figure 9:
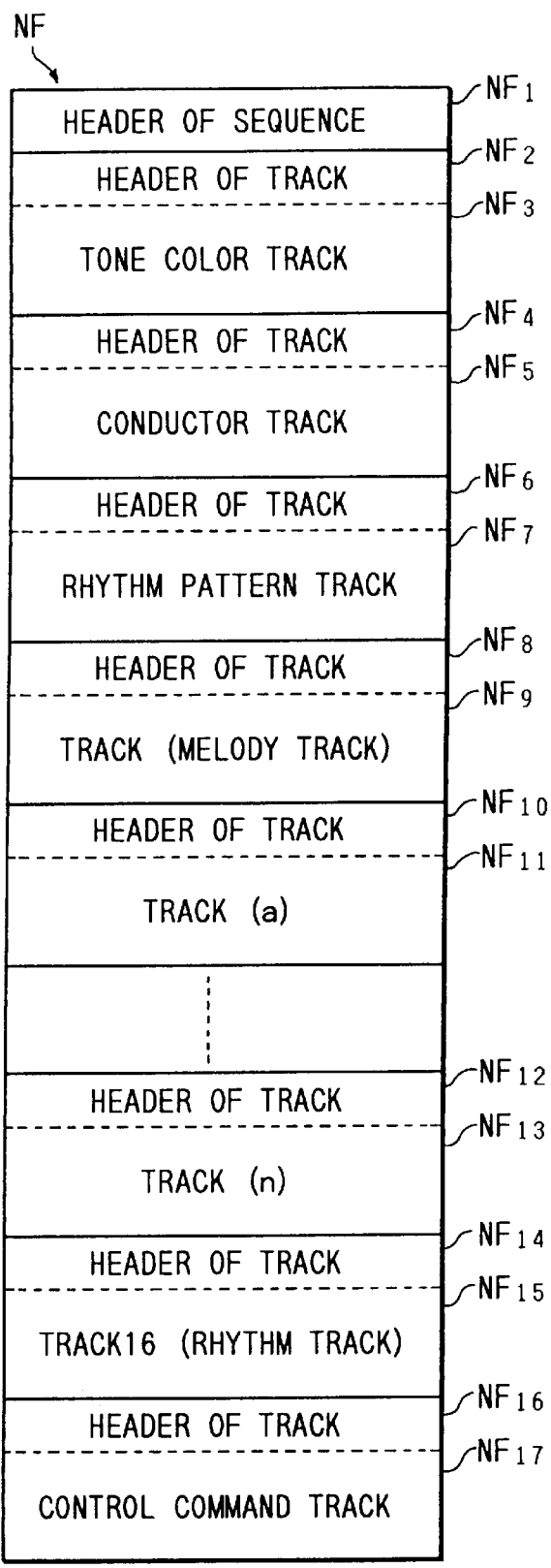
FIG. 9 is a view of the structure of a note file shown in FIG. 8.

In FIG. 8, there is shown a data structure of a MIDI kara-oke file stored in an optical disk which is an information recording medium.

This MIDI kara-oke file format KF is mainly classified into a sequence file SF and a chart file IF. The sequence file SF is a file which is necessary while the kara-oke is being played and also which includes a note file NF, a lyrics file LF and a PCM file PF.

The note file NF is a file in which actual play data is stored and also which includes data areas $NF_1 \sim NF_{17}$. Among these areas, a tone color track $NF_3$ is an area for strong data used to set a plurality of tone colors for the MIDI sound source. A conductor track $NF_5$ is an area for strong data used to set a rhythm and a tempo. A tempo change and the like are stored in this data area. A rhythm pattern track $NF_7$ is an area for storing pattern data in a measure relating to a rhythm. Tracks $NF_8 NF_{15}$ are respectively referred to as note tracks, allowing use of up to 16 tracks. Data for playing the MIDI sound source are stored in these tracks. In particular, a track $INF_9$ is a track exclusively used for storage of melody and a track $NF_{15}$ is an exclusive track for storage of rhythm. Track numbers a~n are 2~15, respectively. Also, control tracks $NF_{16}$ and $NF_{17}$ are used to store various kinds of control commands such as illumination control, LVD player control and the like.

Figures 10, 11:
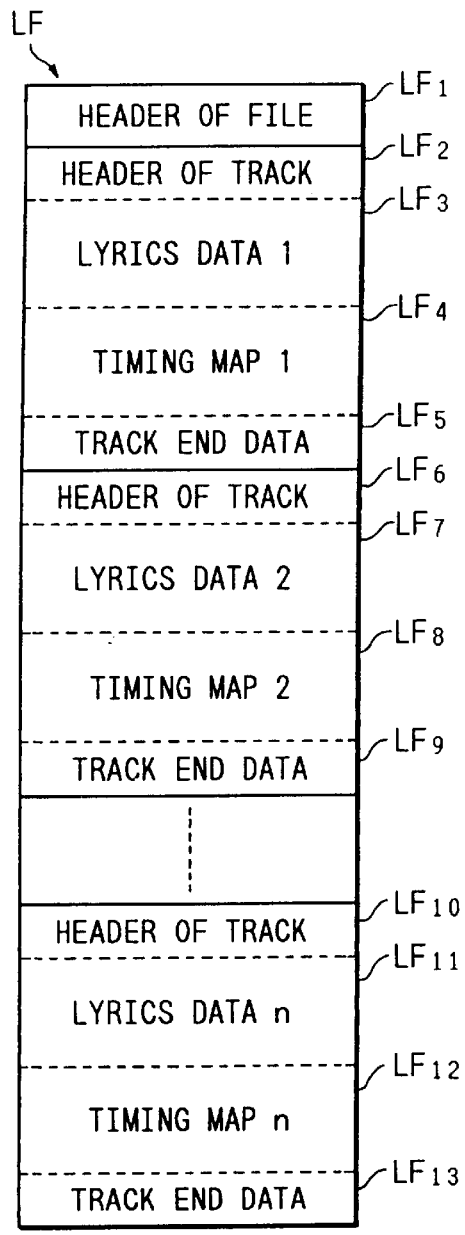
FIG. 10 is a view of the details of the structure of the note file shown in FIG. 9.
FIG. 11 is a view of the structure of a lyrics file shown in FIG. 8.
Figure 16:
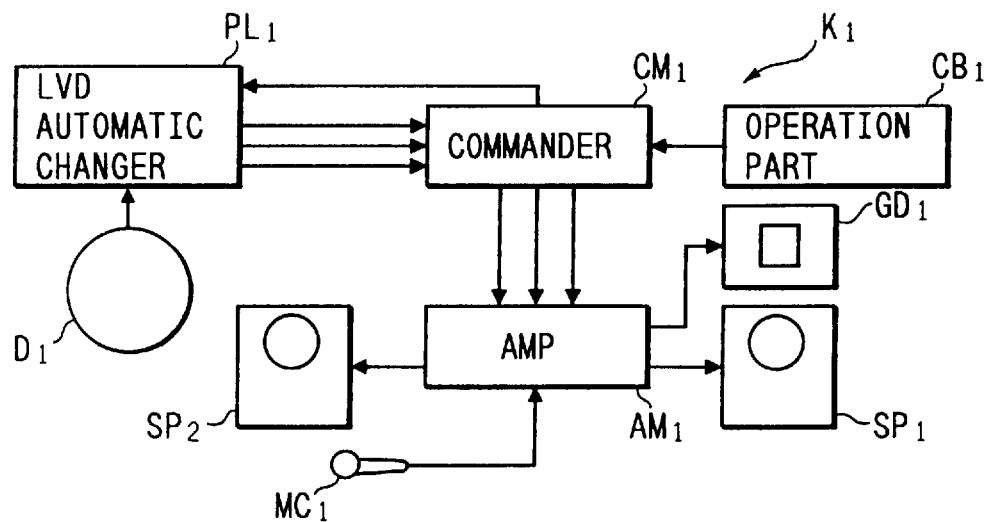
FIG. 16 is a block diagram of the structure of a conventional LVD kara-oke device; and, FIG. 17 is a block diagram of the structure of a conventional CD kara-oke device.
Figure 17:
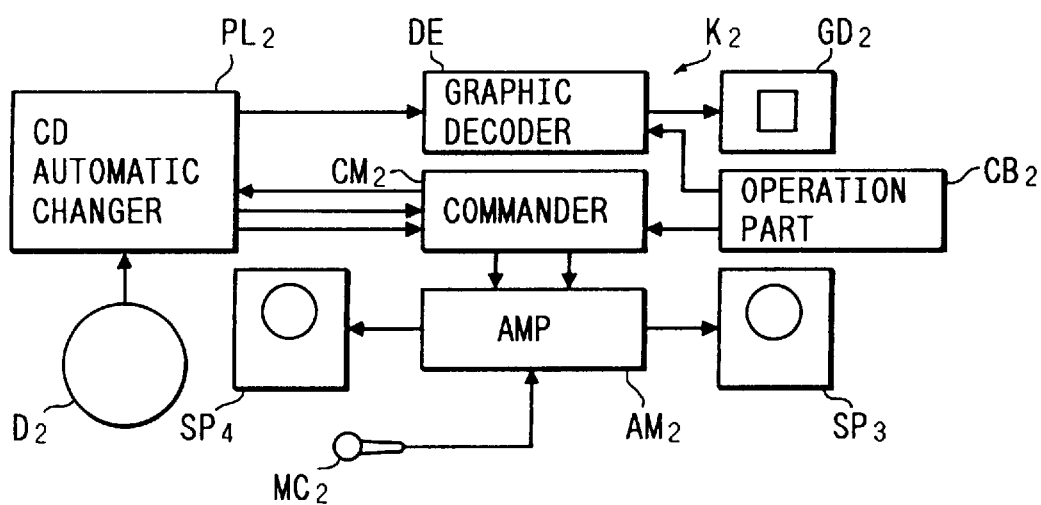

Referring now to FIG. 10, there is shown a view of the detailed structures of the header portion of the track $NF_{16}$ and control command track $NF_{17}$. The track header portion $NF_{16}$ is composed of only track length data. The track length data has a status byte $NF_{61}$ and a data byte $NF_{62}$. The status byte $NF_{61}$ is an FFh: (h: hexa-decimal digit), while the data byte $NF_{62}$ includes four bytes, that is, 00h, 00h, 00h and 00h. Also, various control commands are stored in control command data $NF_{71}$. The control commands include, for example, an illumination presentation command, a video image presentation, a laser video control command, an effect control command and the like. Each of data specifications includes its own byte. That is, a data specification for control of the illumination presentation includes a status byte F1h and a data byte. A data specification for control of the video image presentation includes a status byte F2h and a data byte. A data specification for control of the laser video includes a status byte F4h and a data byte. This laser video control command corresponds to image control information. The laser video control command is constructed, for example, in such a manner as F3h, AAh, BBh, CCh, - - - . Here, AAh represents a disk number, BBh stands for a reproducing surface (such as A surface, B surface or the like), and CCh points out a chapter number of a screen number. Also, track end data $NF_{72}$ is constructed in such a manner that the status byte is FEh and data byte is FEh. The lyrical line file LF is a file to store the data of lyrical line telops to be displayed on a monitor TV and, as shown in FIG. 11, includes data areas $LF_1 \sim LF_{13}$. Among them, $LF_3$ and $LF_7$ are used to store the data of the lyrical lines themselves. Also, $LF_4$ and $LF_8$ are used to store data as to when the lyrical lines are displayed and as to at what speed the lyrical lines are changed in color (scrolled).

The further detailed structure of the lyrics file LF is shown in FIG. 12(A). FIG. 12 shows $LF_2 \sim LF_5$ by way of example.

The track header portion $LF_2$ is a data area which stores therein data to specify a track length, an initial value of a lyrics file telop display color, and an initial value of a lyrics file telop scroll color, and the track header portion $LF_2$ includes $LF_{21} \sim LF_{26}$. However, the data for the lyrics telop display color and lyrics telop scroll color may be omitted. In this case, the data are respectively set to given initial values (default values) by the control part.

A status byte $LF_{21}$ for a track length is 1 byte (FFh, h:hexadecimal digit), while track length data $LF_{22}$ is 4 bytes, as shown in FIG. 12(B). The data of $LF_{22}$ is stored from 1 byte which is a high order byte (MSB) of the track length.

A status $LF_{23}$ for a lyrical display color is 1 byte (A0h), a lyrics display color data $LF_{24}$ is 3 bytes, as shown in FIG. 12(C). Display colors for lyrics telops are specified by means of B (blue), R (red) and G (green). The first byte of these data bytes is specified with B (blue), the second byte is specified with R (red), and the third byte is specified with G (green), respectively in a range of 00h~0Fh.

A scroll color status $LF_{25}$ is 1 byte (B0h) and scroll color data $LF_{26}$ is 3 bytes. The specification of the data bytes is similar to that in the case of the lyrics display color.

Examples of color codes according to B, R, G are shown in FIG. 13. The lyrics data is stored in accordance with a predetermined format, such as a JIS code.

The status of the lyrics data $LF_3$ is C0h and, in the case of the lyrics data, lyrics data following the status C0h are displayed in a screen. Also, the data strings following the status C0h are respectively allocated lyrics numbers in such a sequential order that 1 is allocated to the first data string. The data end status and data are E0h.

The data of a timing map $LF_4$ includes a lyrics telop display timing, lyrics telop erase timing, a lyrics display color, a scroll color, scroll map data and a map end.

The status of the lyrics telop display timing is DFh and the data thereof is 3 bytes which comprise [Display Timing] and [Lyrics Number].

The lyrics of the [Lyrics Number] is displayed at a timing of the [Display Timing]. Referring to the display timing, the first byte of the data is set in the high-order byte of the timing and the second byte is set in the low-order byte of the timing.

The status 2 of the lyrics telop erase timing is D0h and the data thereof is [Off Timing] of 2 bytes. The first byte of the data is a hi-order byte of the timing, while the second byte is a low-order byte of the timing.

The status of the lyrics display color is A0h and the data thereof is [Display Color] of 3 bytes. The format of the data is the same as the format of the lyrics display color in the track header. However, in the timing map, the format must be present after the lyrics telop display timing.

The status of the scroll color is B0h and the data thereof is [Scroll Color] of 3 bytes. The format of the data is the same as the format of the scroll color in the track header. However, in the timing map, the format must be present before the scroll map data.

The status of the scroll map data is C0h and the data thereof is 2 bytes which comprise [Scroll Speed] and [Lyrics Count]. The number of characters of the [Lyrics Count] is scrolled at the speed of the musical note of the [Scroll Speed] per character.

The status of the map end is E0h and the data thereof is E0h. Also, the status of the track end is FEh and the data thereof is FEh. Further, $LF_6 \sim LF_{13}$ are capable of storing the lyrics written in two or more languages, parodies and the like. However, they are not stored when they are not used.

A PCM filed PF is a file which is used to store data of such effective sounds as cannot be generated by the MIDI sound source, background chorus and the like and, as shown in FIG. 14, the PCM file PF includes data areas $PF_1 \sim PF_6$. As the data storage method, there can be employed various kinds of methods such as PCM (Pulse Code Modulation), ADPCM (Adaptive Differential Pulse code Modulation) and the like.

A chart file IF is a retrieval file necessary for request and, as shown in FIG. 15, includes information filed $IF_1$ and $IF_2$. The information file $IF_1$ contains therein the names of songs, the names of singers, the names of lyric writers, the names of composers, the genres of songs, lyrics for retrieval, LVD screen setup data and the like. The intro sequence track $IF_2$ is used to store therein sequence data which allows the MIDI sound source to play a measure of a song.

Next, description will be given below of the preferred embodiments of a recorded information reproducing device according to the invention with reference to the accompanying drawings.

Figure 2:
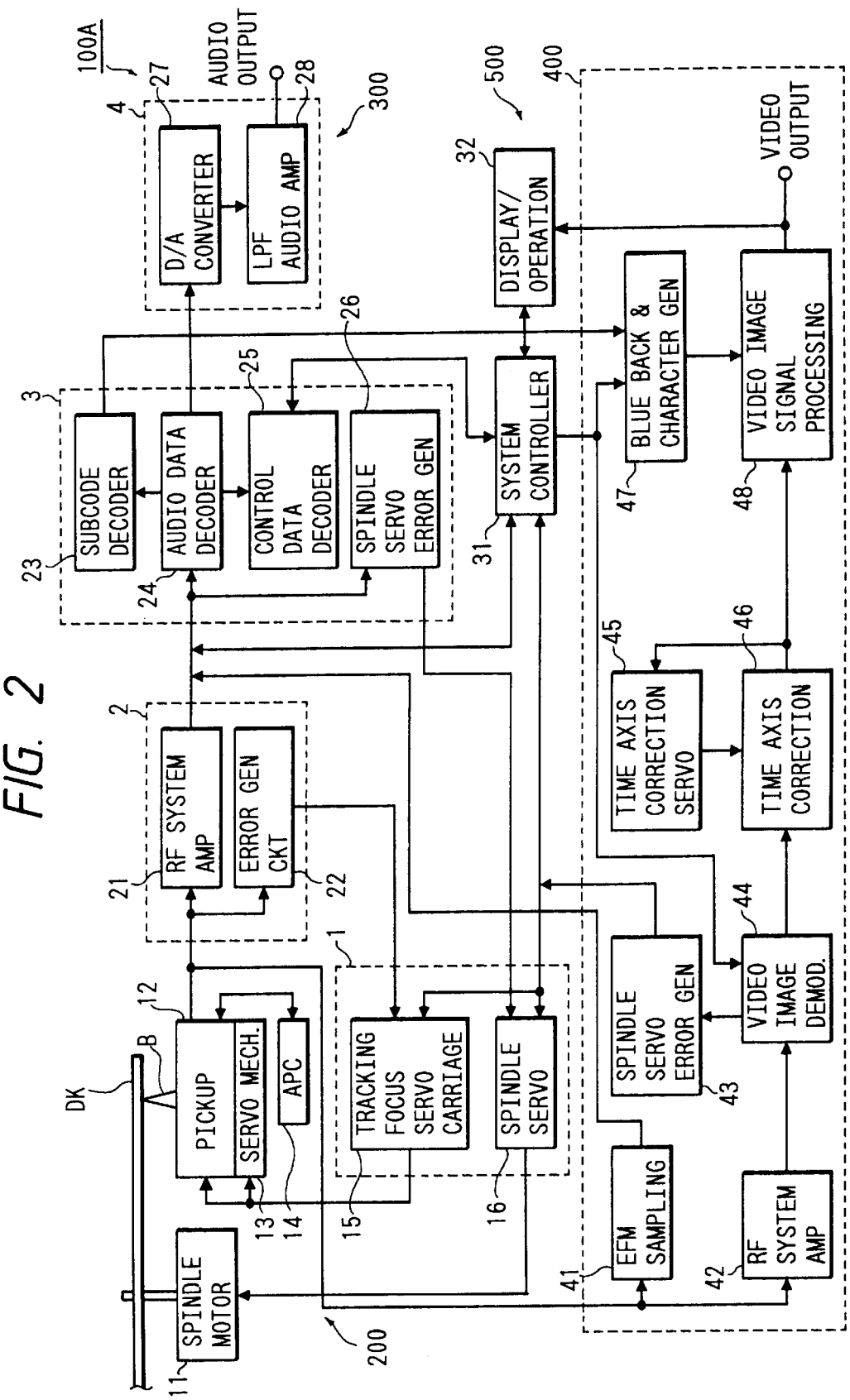
FIG. 2 is a block diagram of the structure of a first embodiment of a recorded information reproducing device according to the invention.

In FIG. 2, there is shown a block diagram of a CDV player which is a first embodiment of a recorded information reproducing device according to the invention. The CDV player 100A, as shown in FIG. 2, consists mainly of an information read system 200, an audio reproduction system 300, a video reproduction system 400, and a control system 500. The information read system 200 includes a spindle motor 11 which is used to rotationally drive a CDV disk DK serving as an information recording medium, a pickup 12 used to read information from the CDV disk DK, a servo mechanism 13 for driving the pickup 12, an APC (Automatic Power Control) circuit 14 and a servo part 1. Also, the servo part 1 includes a tracking focus carriage servo circuit 15 for servo controlling the pick up 12 and servo mechanism 13, and a spindle servo circuit 16 for servo controlling the spindle motor 11.

The audio reproduction system 300 includes a pre-amplifier part 2, a decoder part 3 and a DA converter part 4. The pre-amplifier part 2 includes an RF system amplifier 21 and an error generation circuit 22. The decoder part 3 includes a subcode decode circuit 23, an audio data code circuit 24, a control data decode circuit 25 and a spindle servo error generation circuit 26. The DA converter part 4 comprises a DA converter 27 and an LPF audio amplifier 20. The control system 500 includes a system controller part 31 and a display/operation part 32.

The video reproduction system 400 includes an EFM (Eight to Fourteen Modulation) sampling part 41, a spindle servo error generation circuit 43, a video image demodulation part 44, a time axis correction servo part 45, a time axis correction part 46, a blue back character generator 47 and a video image signal processing part 48.

Next, description will be give below of the operation of the present CDV player 100A.

At first, the CVD side DK is rotationally driven by the spindle motor 11 and the recorded information is read by the pickup 12 by means of a laser beam B and is then converted into an electric signal. The operation of the pickup 12 is driven and controlled by the servo mechanism 13 to be controlled by the servo part 1. Also, in general, a semiconductor laser is used as a light source for reading information recorded in a disk. However, in the semiconductor laser, due to the varying temperatures, the light output of the semiconductor laser may vary with respect to the same current, so that a signal obtained from the disk can vary with respect to the variations of the temperatures. Also, the light output may vary due to the change with passage of time as well. The APC circuit 14 is a circuit which is used to maintain the light output of the semiconductor laser at a constant level with respect to the time change and temperature variations.

A disk information signal read by the pickup 12 is transmitted to the RF system amplifier 21 and error generation circuit 22, and is then transmitted to the audio data decode circuit 24 and spindle servo error generation circuit 26. An audio signal is decoded by the audio data decode circuit 24 and is then transmitted to the subcode decode circuit 23, control data decode circuit 25 and DA converter 27. The DA converter 27 converts the decoded digital signal into an analog signal and then transmits the analog signal to the LPF audio amplifier 28. The LPF audio amplifier 28, at first, operates a low pass filter (LPF) to adjust the bands of the analog signal to thereby adjust the output level of the analog signal, and then outputs the analog signal externally as an audio output. If an external amplifier or external speaker (which is not shown in FIG. 2) is connected to the LPF audio amplifier 28, then the audio output can be output as a sound or a voice.

On the other hand, from the signal transmitted to the error generation circuit 22, the error generation circuit 22 generates a tracking error signal, a focus error signal and a carriage error signal, which provide basic signals for servo control, and then transmits these signals to the tracking focus carriage servo circuit 15. The tracking focus carriage servo circuit 15, based on these error signals, generates a signal used to drive the pickup 12 or servo mechanism 13 and outputs the drive signal to the pickup 12 or servo mechanism 13. Also, from the signal transmitted from the RF system amplifier 21 to the spindle servo error generation circuit 26, the spindle error generation circuit 26 generates an error signal for controlling the spindle servo circuit and then outputs the error signal to the spindle servo circuit 16. In accordance with the error signal, the spindle servo circuit 16 generates a signal for driving the spindle motor 11 and then outputs the drive signal to the spindle motor 11.

Also , from the signal transmitted from the audio data decode circuit 24 to the subcode decode circuit 23, the subcode decode circuit 23 decodes and extracts a subcode signal and then transmits it to the blue back character generator 47. The subcode signal includes therein image signals which can be used to superimpose a character, a symbol, a figure and the like on a screen. The blue back character generator 47 extracts these character signals and outputs them to the video signal processing part 48.

On the other hand, the output of the pickup 12 is transmitted to the EFM sampling part 41 and RF system amplifier 42 as well. The EFM sampling part 41 EFM demodulates the signal and returns it to the RF system amplifier 21. Also, the signal, the level of which is adjusted in the RF system amplifier 42, is transmitted to the video demodulation part 44, in which a video signal is demodulated. The video signal is then transmitted to the spindle servo error generation circuit 43 and time axis correction part 46. The spindle servo error generation circuit 43 outputs this video signal to the spindle servo circuit 16, thereby allowing the circuit 16 to perform its spindle servo control. Also, the video signal transmitted to the time axis correction part 46 is applied time axis servo by the time axis correction servo part 45 and time axis correction part 46, and after that the video signal is output to the video signal processing part 48. To the video signal processing part 48, there is transmitted from the blue back character generator 47 a character signal for superimposing, and the character signal is superimposed on the video signal before it is output externally as a video output.

On the other hand, the CDV player 100A can also be operated from externally by the display/operation part 32 and an operation instruction input therein is transmitted to the system controller part 31. In accordance with the input instruction, the system controller part 31 outputs a control signal to the control data decode circuit 25, tracking focus carriage servo circuit 15, spindle servo circuit 16, video image demodulation part 44 and blue back character generator 47, thereby controlling these parts. The control data decode circuit 25, on the contrary, decodes the control data from the decode signal transmitted from the audio data decode circuit 24 and then transmits the control data to the system controller part 31. Also, the tracking focus carriage servo circuit 15 and spindle servo circuit 16 also transmit the servo information to the system controller part 31.

Figure 3:
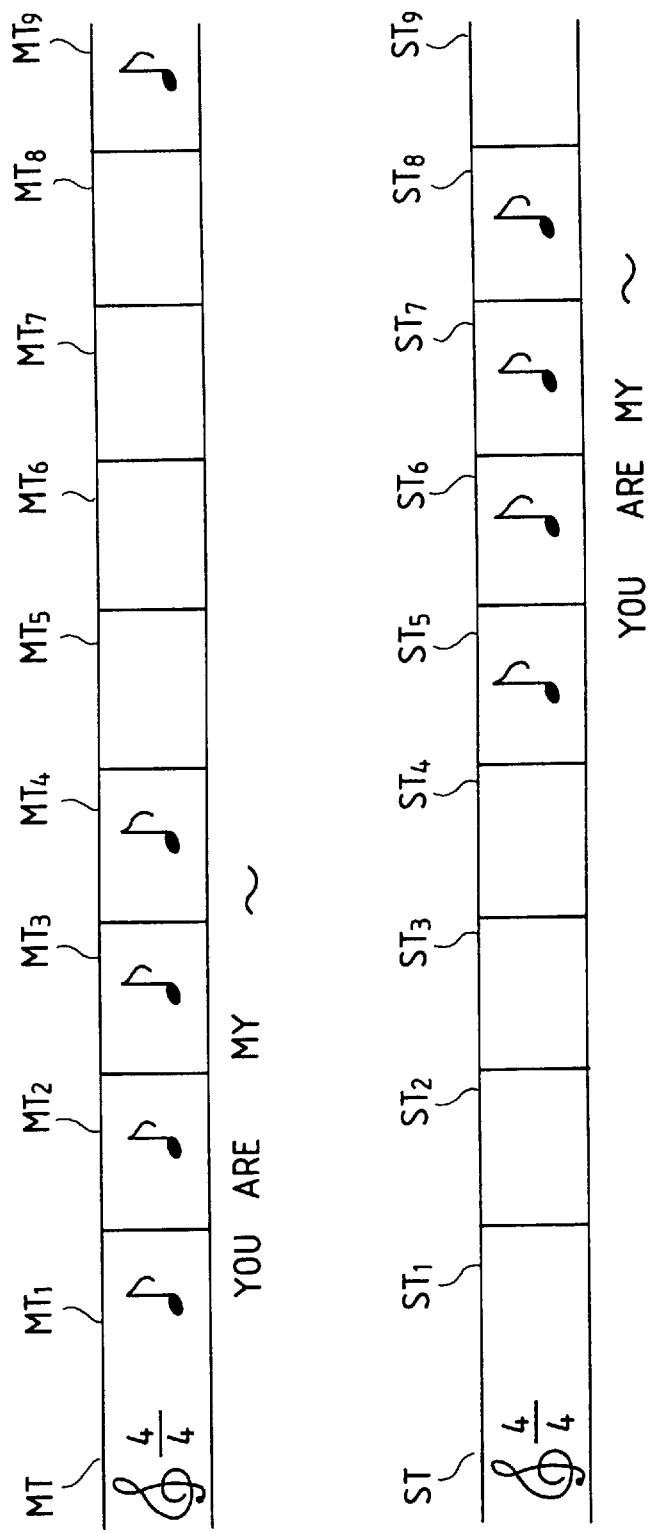
FIG. 3 is a diagram showing an operation of the first embodiment of the present invention.

Description will be given below of the operation of the repeated play and the like which is a characteristic of the present invention by use of FIGS. 2 and 3. In FIG. 2, a control data decode circuit 25 extracts a timing clock signal (F8h) serving as time information out of decoded audio reproduction signal. Twenty-four (24) such timing clock signals provide a time of a quarter note. Therefore, in the case of four-four time, 16 quarter notes provide a time of four bars. By use of this, if 1 phrase is assumed to be 4 bars, as shown in FIG. 3, at first, during the 4 bars $MT_1$~$MT_4$ of a main track MT, the vocal sound of a singer recorded is played. In this case, in a subtrack ST, the kara-oke accompaniment should be silent during the 4 bars $ST_1$~$ST_4$.

And, if the timing clock signals are counted 384 (24×16), then the 4 bars to follow are controlled in such a manner that, during the 4bars $MT_5$~$MT_8$ of the main track, the vocal sound is silent and, during the 4 bars $ST_5$~$ST_8$ of the subtrack, the kara-oke accompaniment is played. Due to such control, a person who wants to practice singing a song can listen to the song sung by a professional singer the during the 4 bars ranging from the first measure to the fourth measure and, during the following 4 bars, the person can actually practice singing the song to the kara-oke accompaniment. In this case, the control of the present embodiment can be performed in such a manner that the main track and subtrack can be switched over to each other as well as the channels of the subcode can be switched to thereby switch the kinds of the MIDI instruments so as to change a tone and the like. Also, by driving the pickup 12, it is possible to realize a repeat operation to play the same part of the lyrics repeatedly or a pause operation (a temporary stop operation). Further, the telops of the lyrics can also be displayed to the music reproduction.

Here, the audio data corresponds to the music information while the control data corresponds to the control information.

The information read system 200 and the pre-amplification part 2 and audio data decode circuit 24 of the audio reproduction system 300 constitute the music information reproduction means. Also, the information read system 200 and the pre-amplification part 2, audio data decode circuit 24 and control data decode circuit 25 constitute the control information reproduction means. Further, the control system 500 corresponds to the control means.

In the above-mentioned embodiment, the description has been given of the CD player. However, the invention is not limited to this, but the invention can also be applied to an LVD player. At present, in general, frequency modulated video image information and music information are recorded on the LVD. In the future, however, it is planned that the vocal part of the LVD is digitized and a subcode signal, a control signal and the like are recorded there. Also, the invention can also be applied to an OMD (Optical Memory Disk).

Figure 4A:
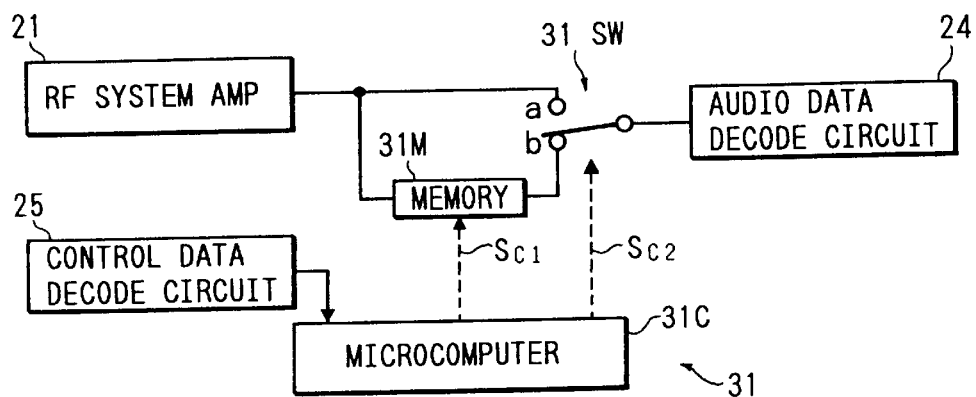
FIGS. 4A and 4B are block diagrams of the structure of a system controller part employed in a second embodiment according to the invention.

Next, description will be given below of the structure of the system controller part 31 employed in the embodiment of the second aspect of the invention by use of FIGS. 4A and 4B. As shown in FIG. 4A, the system controller part 31 includes a microcomputer part 31C, a memory circuit 31M and a switching switch 31SW. At first, the switching switch 31SW is initially connected to an a side in FIG. 4A. And, when a timing clock signal (F8h) representing time information is output to the microcomputer 31C from the control data decode circuit 25 which receives the control data in the MIDI signal, then this timing clock signal is counted and, at a given time, for example, at 384 counts (=24×16), a control signal $S_{c1}$ is output to the memory circuit 31M. Responsive to the control signal $S_{c1}$, the memory circuit 31M temporarily stores musical information corresponding to, for example, one phrase (4 bars) out of the musical information that is transmitted from the RF system amplifier 21. Then, at a certain count value (for example, after 4 bars), a control signal $S_{c2}$ is output from the microcomputer 31C to the switching switch 31SW, with the result that the switch 31SW is connected to the b side in FIG. 4A. Therefore, since the temporarily stored musical information corresponding to 4 bars is input to the audio data decode circuit, the same phrase can be played repeatedly. In this case, if the disk is temporarily stopped or the laser beam is controlled to go back to the same position by means of an instruction from the microcomputer 31C, then play can be resumed at the original position after the repeated playings.

Figure 4B:
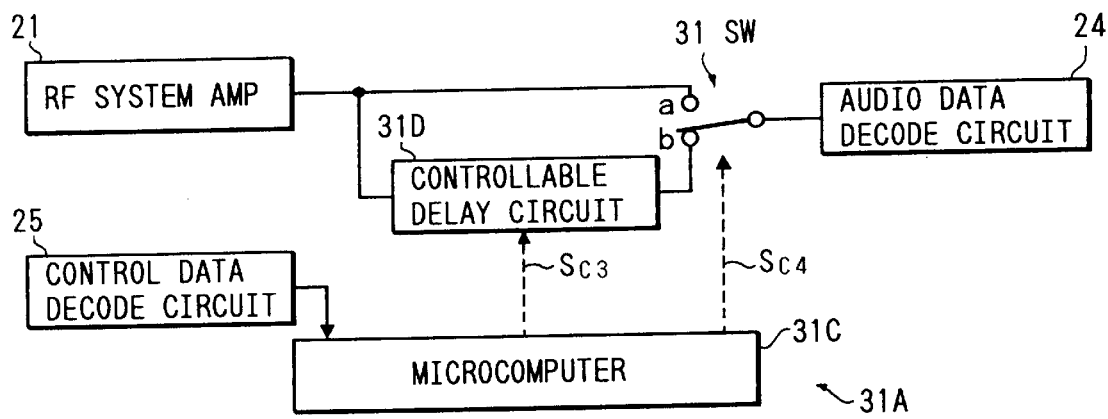

Next, in FIG. 4B, there is shown a block diagram of the structure of a system controller part employed in another embodiment of a recorded information reproducing device according to the invention. In FIG. 4B, the system controller part 31A includes a controllable delay circuit 31D in place of the memory circuit 31M which is employed in the system controller part 31 in the previously-mentioned embodiment. This structure can also obtain a similar effect to the previous embodiment.

Here, it should be noted that the above-mentioned repeated playing can be realized not only by repeating the same track but also by switching the channels (which are classified by the kinds of musical instruments) of the MIDI. In other words, reproduction is also possible by switching tracks from one to another in such a manner that a main track, on which vocal music is recorded, is firstly reproduced and, after that a temporarily stored subtrack (kara-oke playing) is reproduced.

Alternatively, a control signal for pause (temporary stop) may be transmitted from the system controller part 31A to the audio data decoder part 24 and DA converter part 27, which correspond to MIDI sound source means, and, after one phrase is played, a disk may be temporarily paused while the temporarily stored data for one phrase played. In doing so, the play can be resumed at the original position. Also, a lyrics telop can be displayed during music reproduction.

Here, audio data correspond to the musical information and control data correspond to the control information.

The information read system 200 and the pre-amplification part 2 and audio data decode circuit 24 of the audio reproduction system 300 constitute musical information reproduction means. Also, the information read system 200 and the pre-amplification part 2, audio data decode circuit 24 and control data decode circuit 25 constitute control information reproduction means. Further, the system controller parts 31, 31A correspond to data storage means, respectively.

In the above illustrated embodiments description has been given of the CDV player. However, this is not limitative, but according to the invention, an LVD player may be used instead of the CDV player. At present, generally, frequency modulated video image information and vocal information are recorded on the LVD but, in the future, it is also planned that the vocal part is digitalized and a subcode signal or a control signal is recorded therein. Also, the invention can also apply to an OMD (Optical Memory Disk).

As has been described heretofore, according to the invention, in a kara-oke device or the like, when there is used a disk with a vocal sound recorded on the main track thereof and with a kara-oke accompaniment recorded on the subtrack thereof, a given part of music can be practiced repeatedly in synchronization with the progress of the music. Also, after listening to a given part of music with vocal sounds, a person can easily practice singing the given part repeatedly to the kara-oke accompaniment.

What is claimed is:

1. A recorded information reproducing device for reproducing a music sound from an information recording medium on which encoded music information and control information are recorded according to the MIDI standards, said recorded information reproducing device comprising:

music information reproduction means for decoding said encoded music information to output a reproduced music signal;

control information reproduction means for decoding said control information to output a clock signal for timing control; and control means for controlling a reproduction sequence of said music information of said music information reproduction means in accordance with said clock signal.

2. A recorded information reproducing device as claimed in claim 1, wherein said reproduced music signal comprises a first sound signal having an accompaniment with a vocal sound and a second sound signal having the accompaniment only, and wherein said control means switches the reproduction between said first sound signal and said second sound signal.

3. A recorded information reproducing device as claimed in claim 1, wherein said control information decoded by said control information reproduction means includes lyrics data, control data for an external musical instrument, and retrieval data having names of songs, names of singers, names of lyric writers, names of composers and genres of songs.

4. The recorded information reproducing device as recited in claim 1, wherein said clock signal is in accordance with the MIDI standard.

* * * * *